United States Patent [19]
Kim

[11] Patent Number: 6,103,988
[45] Date of Patent: Aug. 15, 2000

[54] APPARATUS AND METHOD FOR BONDING OPTICAL ELEMENTS BY NON-CONTACT SOLDERING

[75] Inventor: Yeong-Ju Kim, Kumi, Rep. of Korea

[73] Assignee: SamSung Electronics Co., Ltd., Kyungki-do, Rep. of Korea

[21] Appl. No.: 09/141,534

[22] Filed: Aug. 28, 1998

[30] Foreign Application Priority Data

Aug. 28, 1997 [KR] Rep. of Korea ............ 97-41906

[51] Int. Cl.[7] ............................................. B23K 26/20
[52] U.S. Cl. ........................... 219/121.63; 219/121.64; 219/121.76
[58] Field of Search ................ 219/121.63, 121.64, 219/121.65, 121.76; 228/121, 225, 244, 41; 156/272.8, 379.6; 264/1.24, 1.25, 1.27, 1.37; 65/392, 407, 501, 152

[56] References Cited

U.S. PATENT DOCUMENTS

| | | | |
|---|---|---|---|
| 4,033,668 | 7/1977 | Presby ........................... | 228/121 X |
| 4,457,467 | 7/1984 | Klement et al. ............... | 228/121 X |
| 4,854,667 | 8/1989 | Ebata et al. .................... | 385/134 |
| 4,899,924 | 2/1990 | Kawaguchi .................... | 219/121.63 |
| 4,963,714 | 10/1990 | Adamski et al. . | |

FOREIGN PATENT DOCUMENTS

| | | |
|---|---|---|
| 63-115673 | 5/1988 | Japan . |
| 2-64609 | 3/1990 | Japan . |
| 2-235592 | 9/1990 | Japan . |

*Primary Examiner*—Gregory Mills
*Attorney, Agent, or Firm*—Robert E. Bushnell, Esq.

[57] ABSTRACT

The present invention relates to bonding of optical elements such as an optical waveguide, an optical collimator, an optical attenuator, an optical isolator, etc., and in particular, to an apparatus and method for bonding the optical elements by non-contact soldering to prevent moisture from penetrate into inside the optical elements by performing soldering without being in direct contact with a bonding portion of optical elements and by sealing up completely a gap formed in the bonding portion between the housings during packaging or bonding optical elements. The apparatus for bonding optical elements comprising: at least two optical elements, an inside of which being provided with optical systems while an outside of which being surrounded by housings; alignment apparatus which fixes one end of the each optical element and aligns optical system of the optical elements; laser light sources disposed respectively at both end of the housings, illuminating the laser beams such that the beams are not focused on outer surface of the housings; lead-supplying units disposed respectively at both upper end of the laser light sources, supplying the lead on the laser beams; and a controller for controlling the laser light sources and the lead supplying units.

20 Claims, 4 Drawing Sheets

APPARATUS AND METHOD FOR BONDING OPTICAL ELEMENTS BY NON-CONTACT SOLDERING

CLAIM OF PRIORITY

This application makes reference to, incorporates the same herein, and claims all benefits accruing under 35 U.S.C §119 from an application entitled Apparatus And Method For Bonding Optical Elements By Non-Contact Soldering earlier filed in the Korean Industrial Property Office on Aug. 28, 1997, and there duly assigned Serial No. 97-41906 by that Office.

BACKGROUND OF THE INVENTION

1. Field of the Invention

The present invention relates to bonding of optical elements such as an optical waveguide, an optical collimator, an optical attenuator, an optical isolator, etc., and in particular, to an apparatus and method for bonding the optical elements by non-contact soldering.

2. Description of the Related Art

There are several known methods of soldering electronic devices and optical elements. A first method is to heat a portion to be bonded by means of an electric iron and then supply lead. A second method is to place a high-frequency induction heater around the optical elements and apply constant heat to the portion to be bonded by high-frequency heating. A third method is to perform soldering by using a laser light source as a heat source, which is available where the electric iron cannot be used due to the high packaging density or there is mass production due to many portions to be bonded, as shown, for example, in U.S. Pat. No. 4,963,714 to Joseph R. Adamski et al. entitled Diode Laser Soldering System. Lastly, a fourth method, which is available where there are many different portions to be bonded, is to apply heat to the portions to bonded by changing a light path using a prism. Here, the lead used in the first and second methods is in the form of a wire. The third and fourth methods, however, utilize lead powder plastered around the portions to be bonded.

The soldering processes according to the known methods are frequently applied to electronic devices. However, in order to apply such a soldering process to optical devices, the following should be considered:

(1) A possible contact during application of the heat to the bonding portions may affect the alignment of the optical elements;

(2) Bonding portions of the optical elements should be kept symmetric to prevent misalignment of the optical elements due to thermal expansion;

(3) Heat should be uniformly applied to symmetrical bonding portions to prevent misalignment of the optical elements;

(4) The bonding portions should be filled completely with lead to secure reliability of the optical elements; and (5) Reproducibility and mass production of the optical elements should be guaranteed.

My examination of weak points in connection with the respective soldering methods mentioned above based on the foregoing considerations shows that neither the first nor second soldering methods meet all of the foregoing five points of consideration. Regarding the third soldering method, while meeting symmetry of optical elements arranged in a plane, it does not meet the foregoing considerations as to symmetry in three-dimensional space. Regarding the forth soldering method, while making connection of desired portions possible, it cannot secure the symmetry.

In short, though very useful to the electronic devices, the conventional soldering methods are not suitable for optical elements due to the misalignment problem. That is to say, during application of heat to the bonding portions, if the lead contacts the surface of the bonding portions, the optical elements may be misaligned. Further, the laser beam applied to the bonding portions of the optical elements cannot be kept symmetric, which causes the misalignment of the optical elements due to the thermal expansion and non-uniform distribution of heat. As a result, the properties of the optical elements are affected, thus lowering reliability of the products. In addition, the reproducibility and mass production of the optical elements are also lowered.

SUMMARY OF THE INVENTION

Therefore, an object of the present invention is to provide an apparatus and method for bonding optical elements by non-contact soldering, in which the interior of the bonding portions of the optical elements is sealed up completely to prevent moisture from penetrating into the optical elements.

Another object of the present invention is to provide an apparatus and method for bonding optical elements by non-contact soldering, capable of minimizing property variations of the optical elements.

To achieve the foregoing objects, an apparatus for bonding optical elements according to the present invention comprises: a couple of optical elements having optical systems therein and which is surrounded by housings; an alignment apparatus which fixes one end of the each optical element and aligns the optical systems of the optical elements; laser light sources arranged respectively at predetermined ends of the housings for illuminating a laser beam such that the beam is not focused on the outer surface of the housings; lead-supplying units arranged respectively at the upper ends of the laser light sources for supplying the lead on the laser beam; and programmable logic control (PLC) which auto-controls the laser light sources and the lead supplying units.

To achieve the foregoing objects, a method for bonding optical elements according to the present invention comprises steps of: fixing a couple of optical elements to an alignment apparatus for aligning the optical systems of the optical elements; illuminating laser beams from plural laser light sources such that the beams are not in contact with cross-sections of bonding portions of the optical elements which are arranged between housings of the optical elements; after a predetermined time, supplying lead from lead supplying units on the laser beams; dissolving the lead by the laser beams so that the lead flows into gaps formed in bonding sections between the housings; after a predetermined time, breaking off a driving force of the lead supplying units under auto-control of a programmable logic control (PLC); and, after a predetermined time, breaking off the laser beams under control of the PLC.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
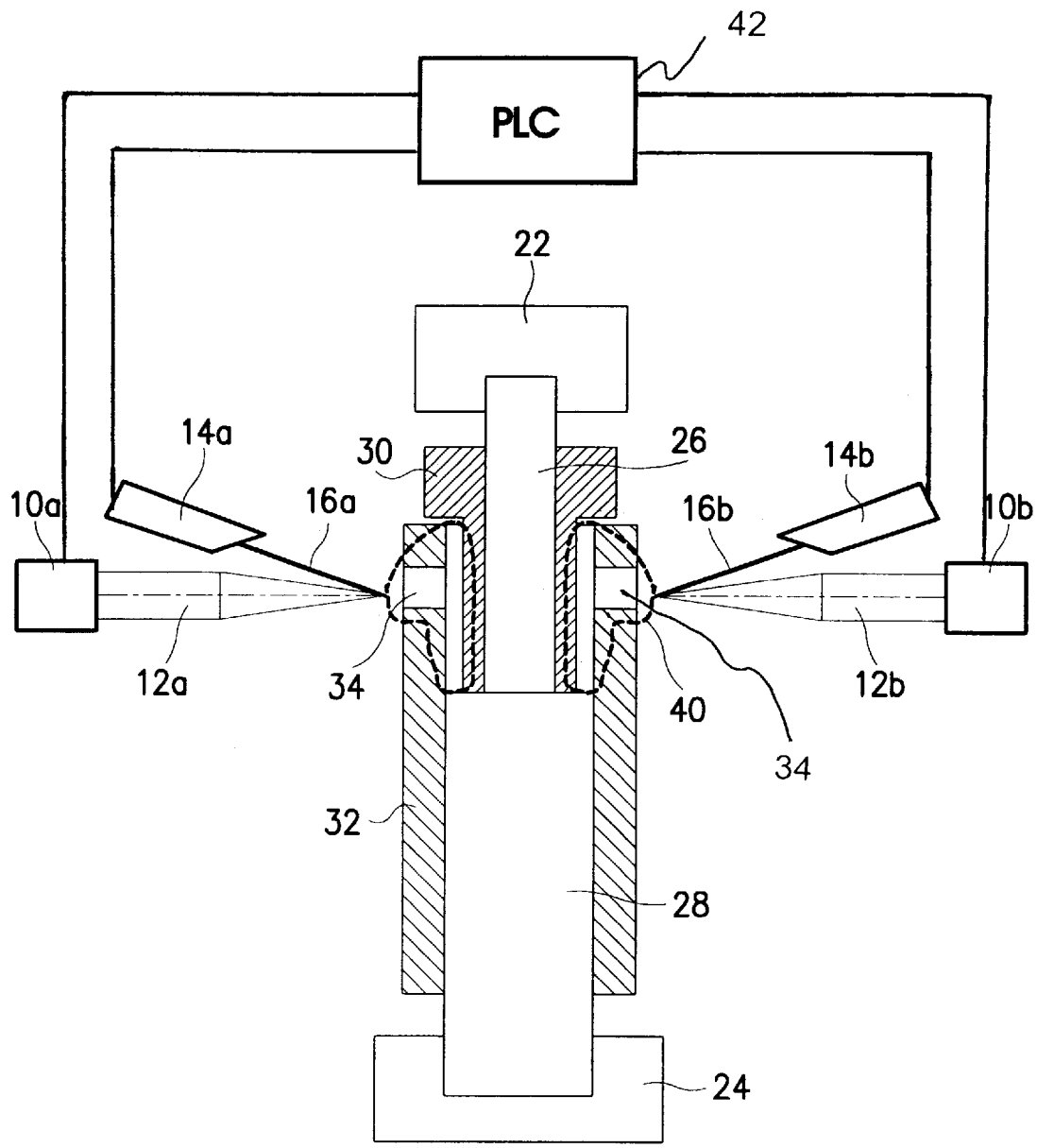
FIG. 1 is a schematic view representing a construction of an apparatus for bonding optical elements by non-contact soldering process according to a preferred embodiment of the present invention.
Figure 2:
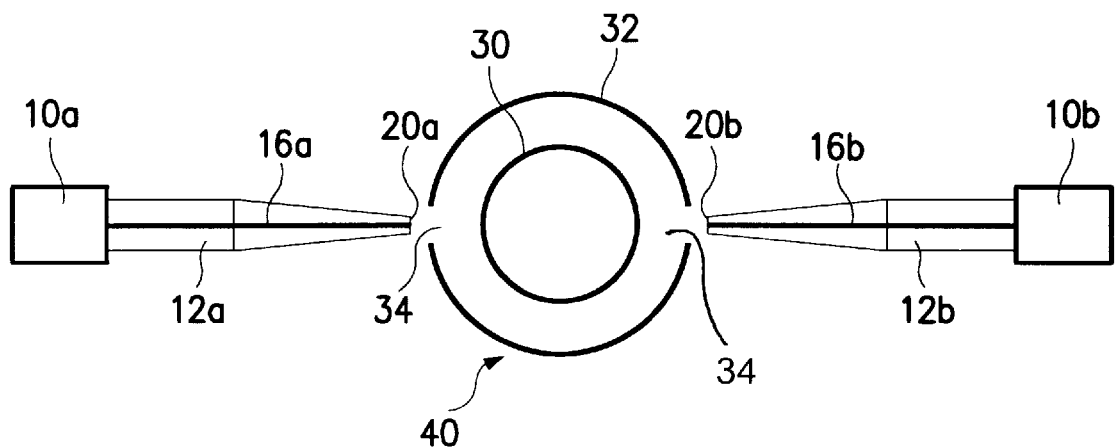
FIG. 2 is a plane view representing a position of the laser beam and a lead supplying position in an apparatus for bonding optical elements by non-contact soldering process according to a preferred embodiment of the present invention.

Referring to FIGS. 1 and 2 the apparatus for bonding optical elements according to a preferred embodiment of the present invention includes optical elements 26 and 28 with various built-in optical systems, alignment apparatus 22 and 24 for the optical elements, continuously operable laser light sources 10a and 10b, lead-supplying units 14a and 14b, and lead 16a and 16b. Further, a housing 30 for protecting the optical system from the ambient environment is provided at the outer circumference of optical element 26. Likewise, a housing 32 is provided at the outer circumference of optical element 28. Through (via) holes 34 are formed symmetrically on both sides of housing 32, and the lead 16a and 16b for fixing housings 30 and 32 are input through via holes 34, while one end of optical element 26 is fixed to alignment apparatus 22 and one end of the optical element 28 is fixed to alignment apparatus 24.

The continuously operable laser light sources 10a and 10b are arranged at both sides of the optical elements 26 and 28 with a predetermined spacing. Laser light sources 10a and 10b illuminate laser beams 12a and 12b, respectively, such that the foci of the laser beams 12a and 12b are not in contact with outer surface of the housing 32, to apply heat to a bonding portion 40 (see FIGS. 2 and 3 for more detail on bonding portion 40) and dissolve lead 16a and 16b, thereby making optical elements 26 and 28 fixed. A diameter of the foci 20a and 20b of the beams 12a and 12b illuminated from the laser light sources 10a and 10b is about 0.5 mm~3 mm, and an electric power of the beam illuminated from the laser light sources 10a and 10b is about 15 W~40 W. Lead-supplying units 14a and 14b, supplying lead 16a and 16b which are in the form of wire, are arranged at the upper end of the each laser light source 10a and 10b. Lead-supplying units 14a and 14b supply lead 16a and 16b on laser beams 12a and 12b. Here the term "on laser beams" is defined as supplying lead, in the form of a thin wire from nozzles of the lead supplying units at a speed and amount controlled by a programmable logic control based on the size of the bonding portion, in contact with the laser beam until it reaches the point of focus of the laser beam so that the lead is dissolved and flows into the bonding portion. That is to say, lead-supplying units 14a and 14b supply lead 16a and 16b so that the lead 16a and 16b comes in contact with the beams 12a and 12b without the lead 16a and 16b being directly contacted with the surfaces of bonding portion 40 prior to being dissolved. Laser light sources 10a and 10b and lead-supplying units 14a and 14b are automatically controlled by PLC (Programmable Logic Control) 42. Namely, PLC 42 controls the turning on and off (ON/OFF) of laser light sources 10a and 10b and controls the supplying time of lead 16a and 16b so that lead 16a and 16b are supplied symmetrically at left and right side of optical elements 26 and 28.

An explanation of operation the mechanism and the method thereof regarding the bonding apparatus for optical elements by the non-contact soldering process with reference to FIGS. 1 through 6 is as follows:

First of all, optical element 26 is fixed and positioned to alignment apparatus 22 and optical element 28 is fixed and positioned to alignment apparatus 24, as represented in FIG. 1. After the foregoing procedure, the alignment apparatus aligns the optical systems (not shown), which are packed inside optical elements 26 and 28, automatically or manually. After the optical systems are aligned at an optimum position, PLC 42 controls laser light sources 10a and 10b. Then, laser light sources 10a and 10b illuminate laser beams 12a and 12b, such that the beams are not in contact with the surfaces of both the housing 30 of optical element 26 and the housing 32 of optical element 28. That is to say, laser light sources 10a and 10b illuminate beams 12a and 12b, as represented in FIGS. 1 and 2, so that the beams can be focused within the domain where the foci of the beams are not in contact with the surfaces of bonding portion 40 of the optical elements. In other words, the illumination position of laser beams 12a and 12b are the bonding portion 40 of the optical elements and the laser light sources 10a and 10b may apply heat at its maximum provided that optical elements 26 and 28 are put at vicinity of the focal length of beams 12a and 12b. Here, the diameters of foci of beams 12a and 12b at their focal length are about 0.5 mm~3 mm. Though they depend on usage, 2.5 mm is applied in the embodiment of the present invention. The illumination time of beams 12a and 12b illuminated from laser light sources 10a and 10b consists of three steps to improve bonding reliability of lead 16a and 16b.

Figure 3:
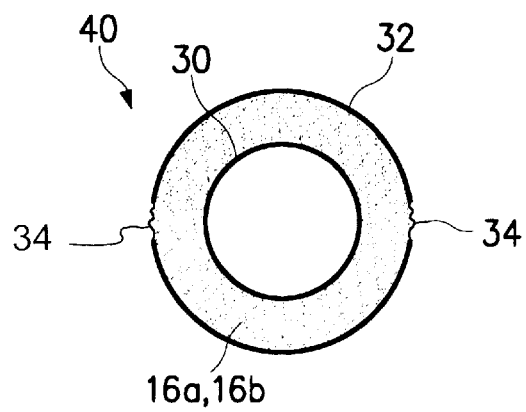
FIG. 3 is a plane view representing the state of the bonding portions' interior being filled with lead, thereby being fixed in manner of a non-contact soldering process according to a preferred embodiment of the present invention.
Figure 4:
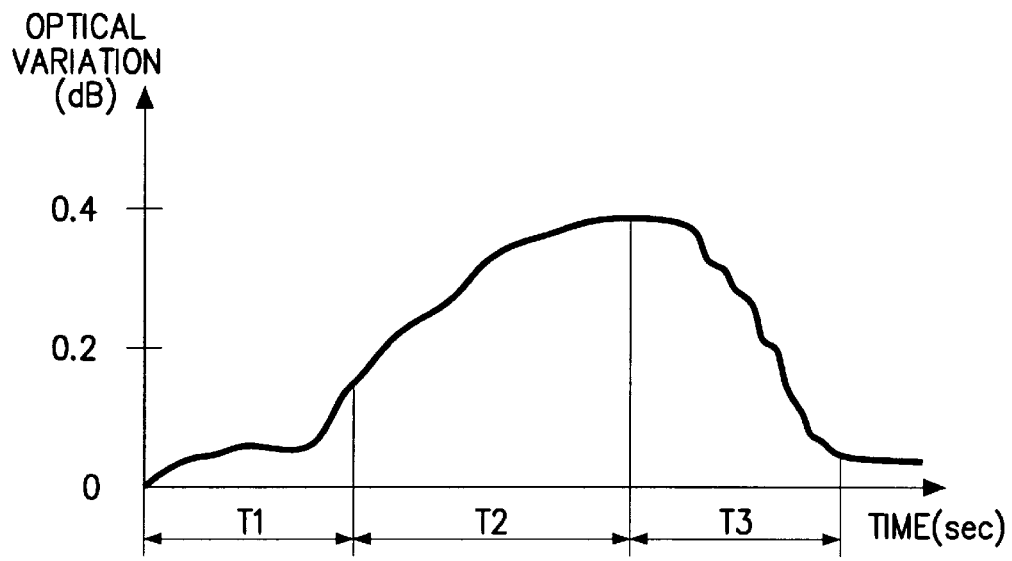
FIG. 4 is a graph representing the variation of optical properties of optical elements to lead-supplying time during bonding optical elements in manner of a non-contact soldering process according to a preferred embodiment of the present invention.
Figure 5:
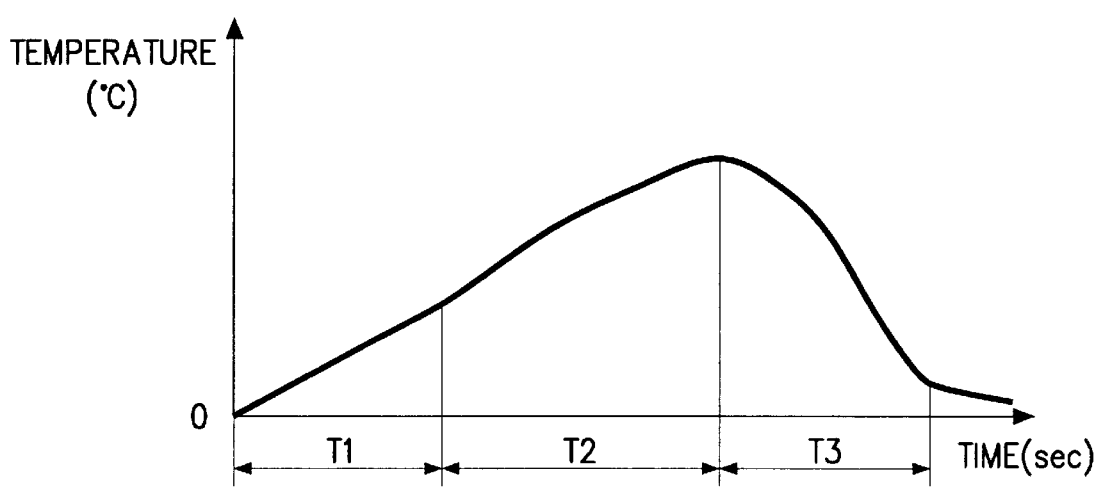
FIG. 5 is a graph representing temperature changes of a bonding portion during bonding in a non-contact soldering according to a preferred embodiment of the present invention.
Figure 6:
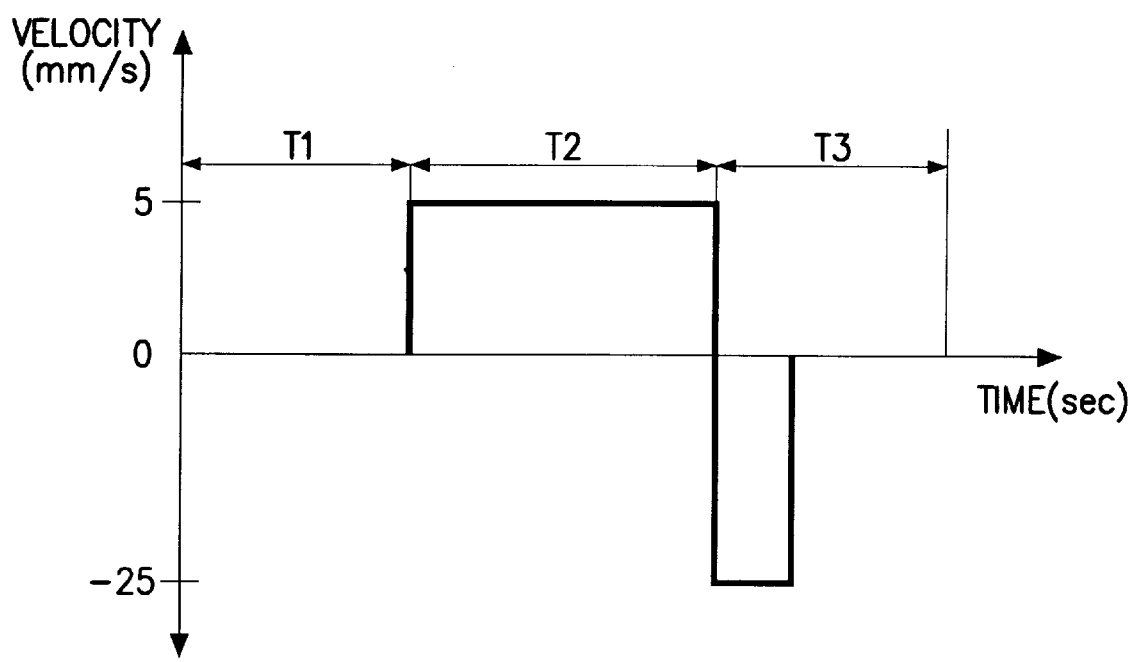
FIG. 6 is a graph representing lead-supplying velocity during bonding in a non-contact soldering process according to a preferred embodiment of the present invention.

After a predetermined time, namely, after laser light sources 10a and 10b heat up, in the vicinity of 100° C., the cross-section of bonding portion 40 sufficiently for a preliminary heating time "T1", increasing affinity of the lead 16a and 16b, PLC 42 automatically controls lead-supplying units 14a and 14b as represented in FIGS. 4 through 6. Then, lead-supplying units 14a and 14b supply lead 16a and 16b on laser beams 12a and 12b. Namely, lead-supplying units 14a and 14b supply lead 16a and 16b at a constant velocity for a primary heating time "T2" as represented in FIGS. 4 through 6. Then lead 16a and 16b, right before it touches bonding portion 40, come into contact with laser beams 12a and 12b in the first place and be dissolved, thereby being melted and flowed into the through holes 34 of the bonding portion 40. Here, lead-supplying units 14a and 14b supply lead 16a and 16b on beams 12a and 12b at a velocity of about 5 mm/sec. After that, under control of PLC 42, lead supplying units 14a and 14b break off supplying lead 16a and 16b at a velocity of about −25 mm/sec at the stage when the primary heating time "T2" elapses. In succession, laser light sources 10a and 10b illuminate beams 12a and 12b, thereby post-heating for the post-heating time "T3" so that lead 16a and 16b supplied already at bonding portion 40 are maintained in a stable formation, under control of PLC 42 as represented in FIGS. 4 through 6. Then, PLC 42 turns off laser light sources 10a and 10b after the lapse of the post-heating time "T3". By the foregoing, optical elements 26 and 28 are bonded in manner of a non-contact soldering process as represented in FIG. 3. Here, in general, when the preheating time is too long, with respect to the preheating time, the primary heating time, and the post-heating time of the laser beam illumination time of laser light sources 10a and 10b, a problem may occur that plated portions on the cross-sections of bonding portion 40 of the optical elements may burn out or all fluxes may evaporate away. So, in the embodiment of the present invention, time is controlled at a ratio of preheating time: primary heating time: post-heating time=1 sec: 1.5 sec~1.7 sec: 1.5 sec, respectively.

While there have been illustrated and described what is to be considered to be the preferred embodiment of the present invention, it will be understood by those skilled in the art that various changes and modifications may be made, and equivalents may be substituted for elements thereof without departing from the true scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for bonding optical elements, comprising:
   an alignment apparatus for aligning two optical elements, the optical elements having housings to be soldered together;
   two laser light sources arranged at opposite sides of the aligned housings of the optical elements such that the foci of the laser beams are outside of the housings and not in contact with the housings;
   two lead supply units respectively disposed over said laser light sources, said lead supply units for supplying lead in contact with the laser beam toward the focus of the laser beam; and
   a controller for controlling said laser light sources and said lead supply units.

2. The apparatus of claim 1, said lead supply units being wire lead supply units for supplying wire lead.

3. The apparatus of claim 1, the focus of each laser light source having a diameter of 0.5–3 mm.

4. The apparatus of claim 1, the power of each laser beam being about 15 W–40 W.

5. The apparatus of claim 1, the focus of each laser beam being located near a separate hole in the housing of one of the optical elements, the holes being for transmitting lead dissolved by the laser beams to a bonding portion of the housings.

6. The apparatus of claim 5, said controller comprising means for turning on and off said laser light sources and means for turning on and breaking off the supply of lead for predetermined time intervals.

7. The apparatus of claim 6, said controller comprising means for turning on said laser for 1 second, supplying lead for 1.5 to 1.7 seconds and before breaking off the supply of lead, and then turning off the lasers after 1.5 seconds.

8. The apparatus of claim 6, said controller and said lead supply units comprising means for supplying lead at velocities of about 5 mm/second and −25 mm/second during time intervals.

9. The apparatus as set forth in claim 1, said alignment apparatus further comprising:
   two alignment apparatus portions, the portions respectively attached to a predetermined end of each said optical element.

10. A method for bonding optical elements, said method comprising steps of:
    fixing optical elements having optical systems and housings on an alignment apparatus and aligning said optical systems of said optical elements;
    illuminating two laser beams from laser light sources on opposite sides of the optical elements such that the focus of each beam falls outside of the housings of the optical elements and does not contact the housings;
    supplying said lead from above each laser beam in contact with the laser beam until the lead reaches the focus of the beam;
    dissolving said lead at the foci of the laser beams, so that said lead flows into a bonding portion of said housings;
    breaking off the supplying of lead; and
    turning off said laser beams.

11. The method as set forth in claim 10, said step of supplying lead being performed after the laser beams have been illuminated for a preliminary heating time for heating a cross-section of said bonding portion of said housings.

12. The method as set forth in claim 11, said step of breaking off the supplying of lead being performed after a primary heating time has elapsed.

13. The method as set forth in claim 12, said step of turning off the laser beams being performed after a post-heating time for heating said cross-section of said bonding portion has elapsed.

14. The method as set forth in claim 13, the ratio of said preheating time, said primary heating time, and said post-heating time being approximately 1:1.5 to 1.7:1.5.

15. The method as set forth in claim 13 said laser beams having an electric power of about 15 W to 40 W during the preheating time, the primary heating time, and the post-heating time.

16. The method as set forth in claim 10, said step of supplying lead comprising supplying said lead at a velocity of 5 mm/sec.

17. The method as set forth in claim 10, said step of breaking off the supply of the lead being performed a velocity of −25 mm/sec.

18. The method as set forth in claim 10, said step of illuminating said laser beams comprising using laser light sources with an electric power of the beam being about 15 W to 40 W.

19. An apparatus for bonding optical elements by non-contact soldering, comprising:
    a housing surrounding each optical element to be bonded;
    two laser light sources arranged respectively at diametrically opposite sides of the housings of the optical elements, said laser light sources generating laser beams each having a focus, said beams within a domain where the foci of said laser beams are not in contact with said housings at a bonding area of the optical elements disposed between said housings;
    lead supply units each disposed over said laser light sources, said lead supplying units for supplying lead in contact with the laser beams toward the foci of the laser beams to solder said housings together; and
    a controller for controlling said laser light sources and said lead supply units.

20. The apparatus as set forth in claim 19, further comprising:

said controller controlling said lead supply units to supply said lead, in response to a driving force from said lead supply units, in contact with said laser beams after a first predetermined time period;

said laser beams dissolving said lead during a second predetermined time period, so that said lead flows through via holes in one of said housings and into a gap formed in the bonding area between said housings;

said controller breaking off said driving force of said lead supply units after said second predetermined time period elapses; and said laser beams, under control of said controller, being turned of after a third predetermined time period elapses.

* * * * *